May 24, 1932. E. A. SPERRY, JR 1,859,752
AUTOMATIC CONTROL OF AIRCRAFT
Original Filed June 29, 1928  4 Sheets-Sheet 1

INVENTOR
ELMER A. SPERRY. JR.
BY
his ATTORNEY.

May 24, 1932.   E. A. SPERRY, JR   1,859,752
AUTOMATIC CONTROL OF AIRCRAFT
Original Filed June 29, 1928    4 Sheets-Sheet 2
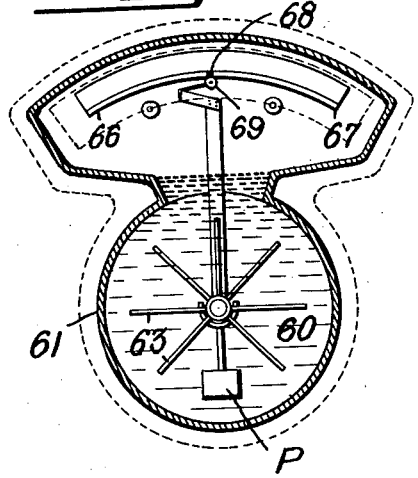
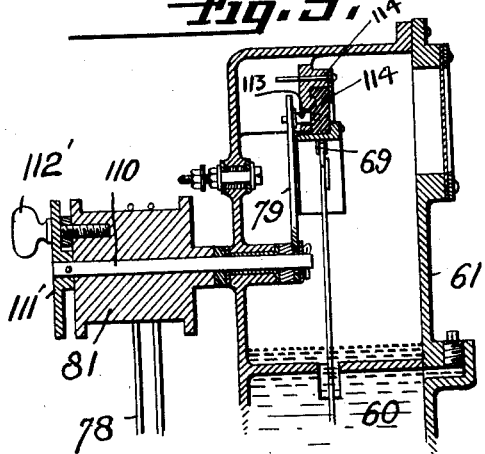
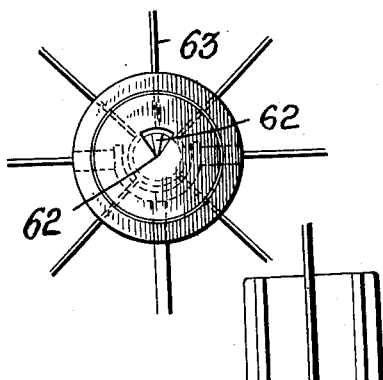
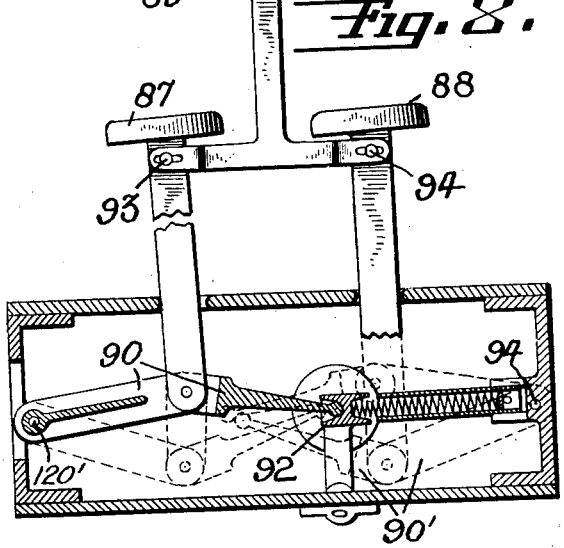
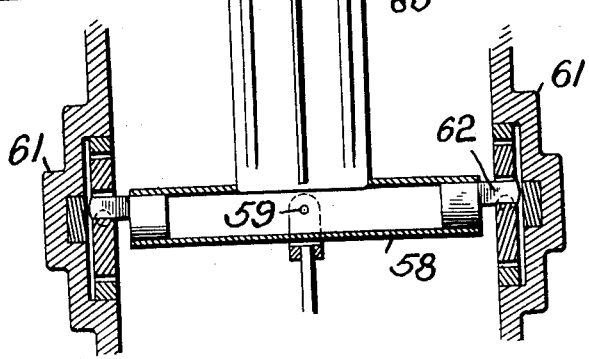
INVENTOR
ELMER A. SPERRY, JR.
BY
his ATTORNEY.

May 24, 1932.  E. A. SPERRY, JR  1,859,752
AUTOMATIC CONTROL OF AIRCRAFT
Original Filed June 29, 1928  4 Sheets-Sheet 3

INVENTOR
ELMER A. SPERRY, JR.
BY
Herbert H. Thompson
his ATTORNEY.

May 24, 1932.  E. A. SPERRY, JR  1,859,752
AUTOMATIC CONTROL OF AIRCRAFT
Original Filed June 29, 1928  4 Sheets-Sheet 4

INVENTOR
ELMER A. SPERRY, JR.
BY
his ATTORNEY.

Patented May 24, 1932

1,859,752

UNITED STATES PATENT OFFICE

ELMER A. SPERRY, JR., OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

AUTOMATIC CONTROL OF AIRCRAFT

Application filed June 29, 1928, Serial No. 289,109. Renewed September 19, 1931.

This invention relates to automatic steering for dirigible craft and is designed particularly for meeting the special problems that arise in the automatic control of aircraft. Broadly, it is the object of my invention to control the steering and position of the aircraft by automatic control of the steering rudder, ailerons and elevators.

The importance of the aileron control has heretofore not been recognized because it has not been appreciated that the actuation of the ailerons is not merely for the purpose of imparting stability to the aircraft but that the ailerons play a very definite rôle also in controlling the direction of the aircraft. Whenever the wings of the aircraft become inclined it is well known to every aviator that there is at the same time an accompanying turning movement in azimuth. Indeed, aviators employ the ailerons for the purpose of steering in azimuth as well as they do the steering rudder. I have recognized this situation and have provided an inter-connection between the aircraft wings and the rudder through the aileron control so that whenever the ailerons are actuated in response to the tilting of the wings there is also an actuation of the steering rudder so that any turning movement that has been introduced by the tilting of the wings will be at the same time counteracted by the actuation of the steering rudder.

It is a further object of my invention to provide means for automatically counter-balancing inequality of load that would normally impart a lateral tilt to the aircraft.

It is another object of my invention to provide means whereby an automatic control for the steering rudder, ailerons and elevators may be easily rendered effective or ineffective at will. Further, it is an object of my invention to provide means whereby one or all of the above named controls may be rendered ineffective either individually or as a whole.

It is a further object of my invention to provide suitable baselines for the control of the ailerons and elevators in the form of a gyro or one or more liquid-damped pendulums. It is the purpose of my invention to utilize such vertical baselines in conjunction with a gyroscopic baseline for the azimuth control of the craft.

Other objects and advantages of this invention will become apparent in the following detailed description thereof.

In the accompanyinging drawings,

Fig. 4 is a vertical section through one of the liquid-damped pendulums for establishing a vertical baseline.

Fig. 5 is a vertical section through the upper portion of the Fig. 4 device, showing the follow-up connection to the contactor.

Fig. 6 is an enlarged detail showing the knife-edge, universal mounting for the liquid-damped pendulum of Figs. 4 and 5.

Fig. 7 is a vertical section through the Fig. 6 bearing.

Fig. 8 is a vertical section through the clutching mechanism for rendering the various controls effective and ineffective.

Figure 1:
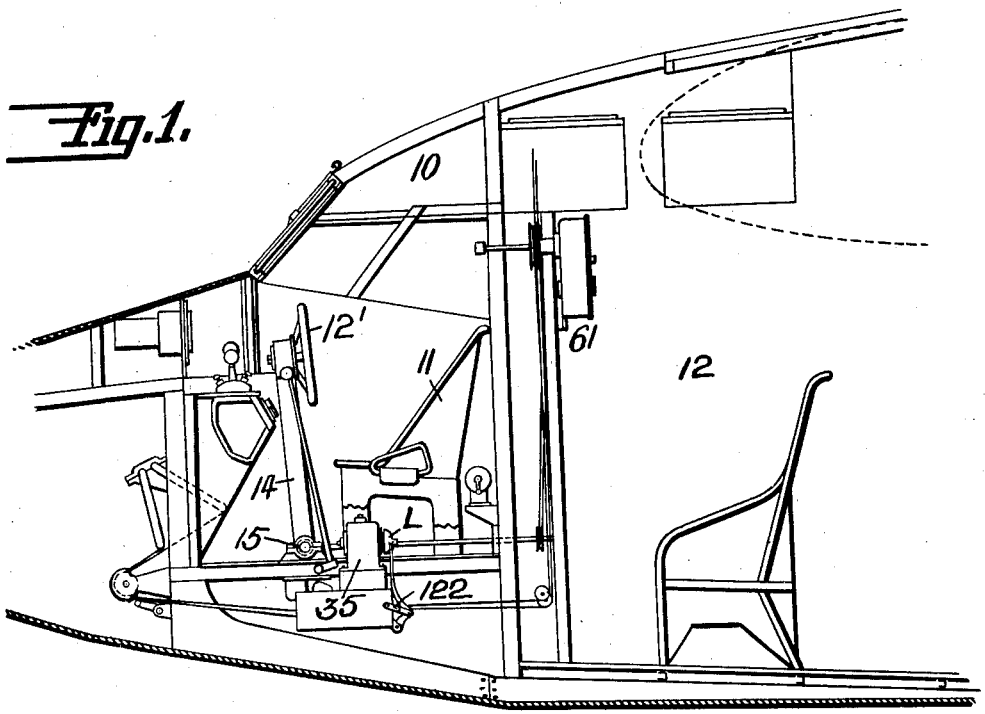
Fig. 1 is a vertical section through the forward end of an aircraft having my automatic control device applied thereto.
Figure 2:
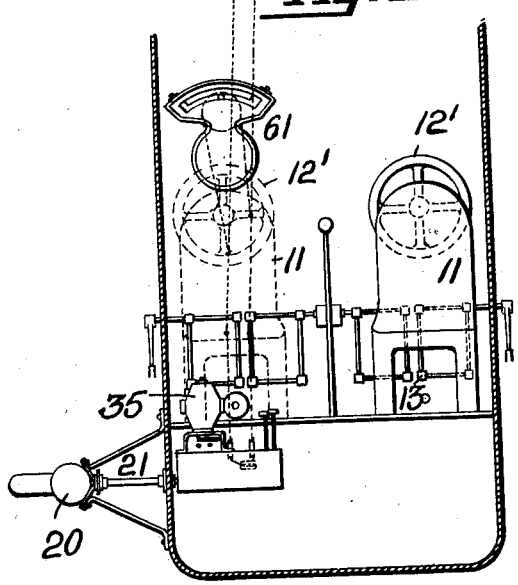
Fig. 2 is a vertical section through the Fig. 1 form of the device at right angles to said Fig. 1.

Referring to the drawings, I have shown in Fig. 1 the driver's compartment or cock-pit 10 of an aircraft with a pair of drivers' seats 11 and to the rear thereof a passenger's compartment 12. The two drivers' seats and the duplication of the control mechanism indicate that this aircraft is of the dual-control type wherein either of two pilots may control the rudder, ailerons and elevators. In front of each driver's seat 11 is a wheel 12' for controlling the ailerons, foot pedals 13 for controlling the rudder, the wheel 12' being supported in the upper end of a standard 14 pivoted at 15 so that the movement of said standard about pivot 15 actuates the elevators, all in a well known manner of the standard Depardussin control.

Figure 3:
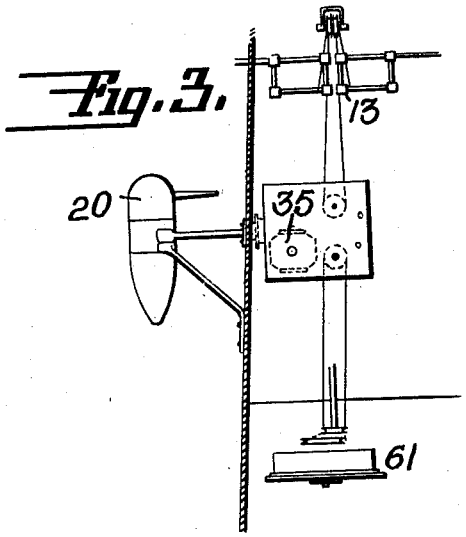
Fig. 3 is a horizontal section showing the automatic control equipment of Figs. 1 and 2 in plan.
Figure 9:
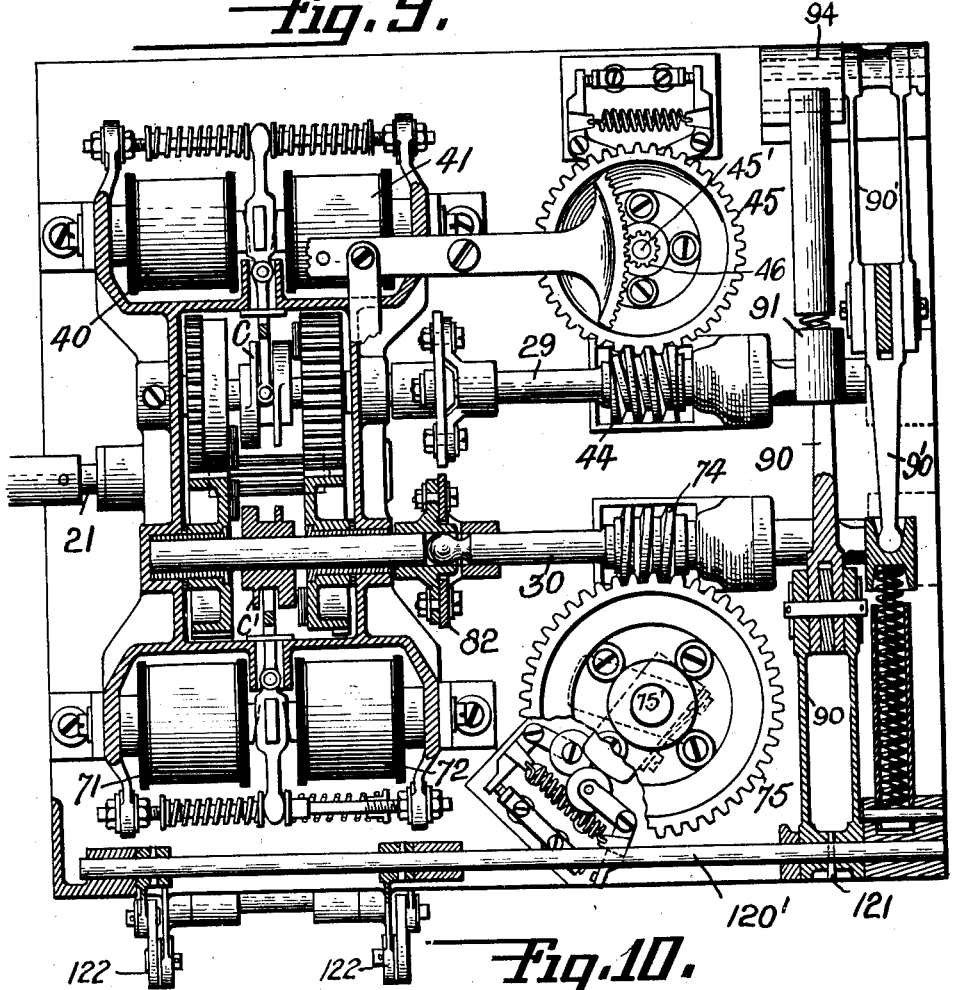
Fig. 9 is a horizontal section through the servo motor.
Figure 10:
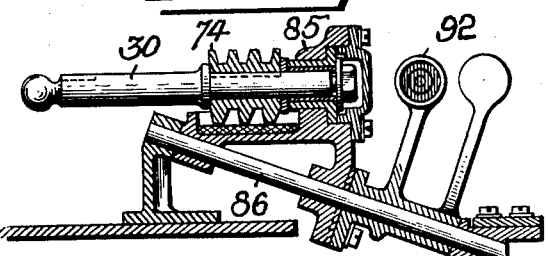
Fig. 10 is a vertical section showing the means for disengaging the servo-motor from the parts actuated thereby.
Figure 11:
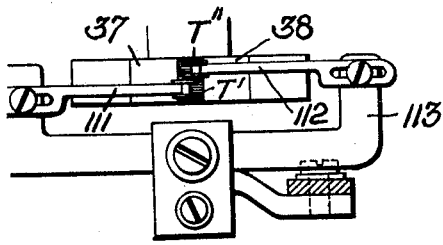
Fig. 11 is an enlarged detail of the contact mechanism cooperating with the gyroscopic baseline.
Figure 12:
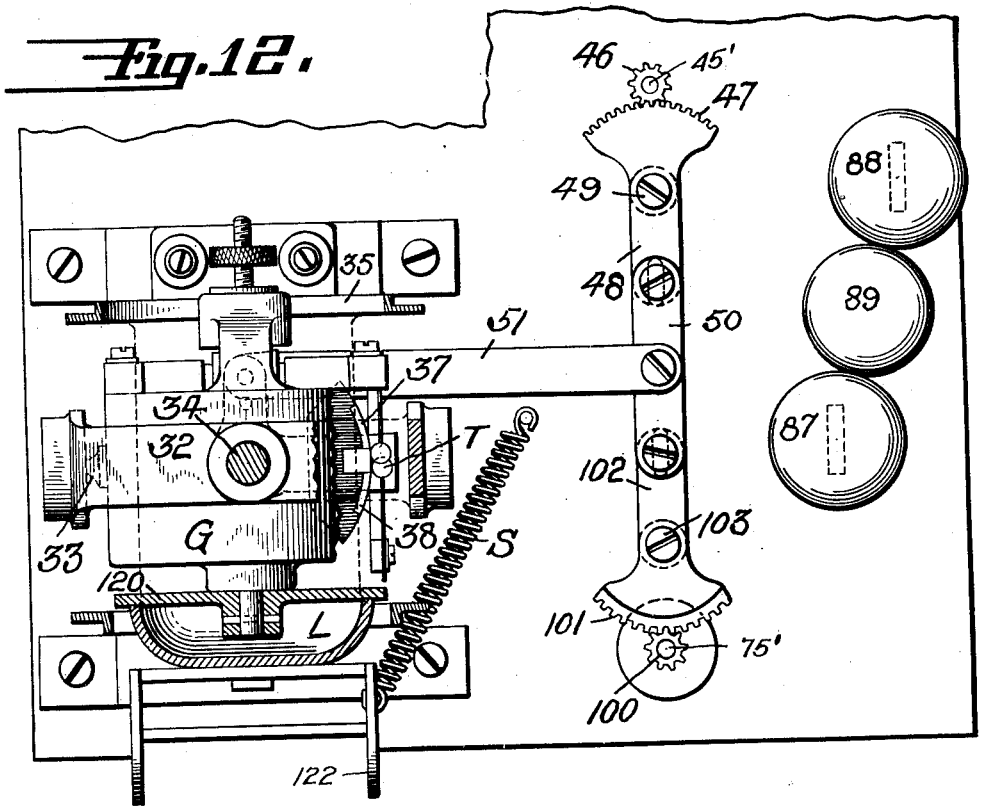
Fig. 12 is a plan view of the gyroscopic baseline.

In order to control the aircraft automatically I provide means for automatically performing all of the above named functions relating to the control of the aircraft rudder, the ailerons and elevators. To accomplish this I must necessarily employ a source of power or servo motor, and this I may obtain either from the engine mechanically or electrically or by mounting a wind generator 20 (see Fig. 3) on the outside of the aircraft in the stream-line thereof and causing the rotation of the generator fan to drive a shaft 21 (see Fig. 9) which drives two sets of gears, the gears of each set being oppositely driven so that when one or the other of said gears is clutched to the driving shaft, the power is taken off in one direction or the other to drive shafts 29 and 30 in one direction or the other, said shafts being utilized for operating the rudder-operating cables and the aileron-actuating cables, respectively.

The automatic control of the rudder is effected by establishing a suitable azimuth baseline, as for instance, by a gyro G mounted with three degrees of freedom, that is, about its own spinning axis, within a vertical ring 32 about an axis 33, said ring being in turn pivotally mounted on a vertical axis 34 in the fixed frame 35, which has been broken away to disclose the underlying mechanism, so that the gyro maintains its position in space. The said vertical ring of the gyro carries two live contact segments 37—38 separated by an insulating segment, and cooperating with said segments is a trolley member T carried by the fixed frame and, therefore, partaking of the movements of the aircraft. Thus when the aircraft moves to the right or to the left, trolley member T engages contact segment 37 or 38 to energize electro-magnet 40 or 41 (see Fig. 9) of the servo motor to operate the clutch C in one direction or the other to drive shaft 29 in one direction or the other and thence through suitable gearing, which is preferably irreversible such as worm 44 and worm wheel 45, to actuate the rudder cables in the proper direction to restore the craft to its original position. By providing an irreversible gearing between the rudder and the servo motor, the usual chattering or hunting action of the servo motor is prevented. A follow-up drive to the trolley T is effected by means such as gear 46, on shaft 45' of worm-wheel 45 and the segmental gear 47 and lever 48 pivoted at 49, said lever operating through links 50 and 51 to cause trolley T to follow the movements of the gyro contacts 37—38 relative to the craft.

For automatically controlling the ailerons and elevators I provide a vertical baseline which may take the form of a pendulum P whose movements are heavily damped as by means of a heavy liquid 60 enclosed within a container 61. The pendulum may be pivoted upon a shaft 58 at 59, said shaft being mounted upon a knife edge bearing 62 upon an axis at right angles to axis 59 so that the pendulum is universally mounted and thus no error will be introduced if rolling occurs while the craft is tilted fore and aft, as would otherwise be the case. The pendulum member may be provided with a plurality of plates 63 adapted to operate in said heavy fluid 60 in order to damp the movements of the pendulum more effectively. The tilting of the aircraft will carry with it the frame 60 and a contact member comprising two segments 66 and 67 separated by an insulating segment 68 with which engages a trolley 69 carried by the upper end of the pendulum. Tilting of the craft in one direction or the other will cause trolley 69 to engage contact segment 66 or 67 to energize one or the other of electromagnets 71—72 to actuate clutch C' in one direction or the other to drive shaft 30 in one direction or the other and actuate the aileron operating cables in such direction as to cause the aircraft to return to the horizontal position. The drive from shaft 30 is irreversible like to that from shaft 29 and includes a worm 74 geared to a worm wheel 75. A suitable follow-up connection from the worm wheel 75 to the contact member 66—67 may be effected through means such as cables 78 actuating an arm 79 pinned to said contact member, said arm being fixed to a shaft 80 of a hub 81 adapted to be rotated by said cables 78.

When trolley 69 rests upon insulation 68 the wings of the craft are horizontal. If, however, there is any lateral inequality in the distribution of the load there will be a constant tendency for the craft to tilt in one direction with consequent repeated energization of the aileron control mechanism to restore the craft to the horizontal. Instead of such continued operation of the aileron control I may provide means for imparting a permanent displacement of the ailerons to counteract any constant factor of inequality of load and thus obviate the necessity of repeated operation with constant wear upon the parts of the automatic aileron control mechanism. For this purpose I may provide a shaft 110 extending through hub 81 and adapted to be actuated by a handwheel 111' which may be locked to said hub in any adjusted position by means of a wing nut 112'. The inner end of shaft 110 may be provided with a member 79 having a forked end with which a pin 113 on slide 114 engages. The current carrying segments 66 and 67 are mounted on the underneath surface of said slide, the slide being slidable in a groove in the stationary part 114'. It will be apparent that actuation of hand-wheel 111 to displace the contact segments 66—67 with respect to trolley 69 will cause an actuation of the ailerons until trolley 69 reaches the insulated segment 68. The ailerons will thus maintain this actuated position as a new baseline. This degree of actuation of the ailerons is set so that it just counteracts the inequality of load so that when trolley 69 rests upon insulated segment 68 the craft is horizontal.

I have shown only the aileron control but not the elevator control because the elevator control is an exact duplicate of the mechanism for actuating the ailerons except that the pendulum for governing the elevator control is positioned at 90° with respect to the pendulum for the aileron control.

In order to render any of the above controls ineffective, it is only necessary to disengage the worms 44—74 from their respective wormwheels. For this purpose I have mounted the said worms in a housing 85 pivotally mounted for rotation on an inclined shaft 86 so that when said housing is rotating in one direction it will serve to disengage the worm from the wormwheel. To permit such disengagement I have shown the shafts 29—30 as connected to the servo motor through flexible connections 82 permitting the relative axial displacement of the said shafts 29—30 with respect to the servo motor shafts. For rotating the housings 85 about shafts 86 I may provide handles 87, 88, one for each of said housings 85, and cause said handles each to actuate toggles spring-biased 90, 90' whose movement in one direction or the other causes the end 91 thereof to rotate a member 92 fixed to the housing. The handles 87—88 may be operated individually or together by a common handle 89 pivotally connected to handles 87—88 so as to float about said pivots 93 and 94.

It has been explained in the introduction to this specification that tilting of the aircraft wings is always accompanied by turning in azimuth and it is desirable to counteract this turning tendency. For this purpose I provide means actuated from the follow-up gearing of the ailerons i. e. pinion 100 on the shaft 75' of wormwheel 75, said pinion meshing with said segmental gearing 101 for relatively displacing the trolley member T with respect to the gyro contact segments 37—38 in such direction as to cause actuation of the rudder in a direction to counteract the turning movements caused by tilting of the aircraft. I actuate the rudder from the aileron follow-up because every time tilting of the aircraft wings takes place the aileron actuating mechanism is set in motion to restore the craft to the horizontal. The aileron follow-up includes the gearing 100—101, the latter being a segmental gear of a lever 102 pivoted at 103 and having its other end connected to one end of link 50, the other end of which link is connected to the rudder follow-up including the lever 48. It will now be seen that the operation of the aileron follow-up will always actuate link 50 to cause actuation of link 51 and hence displacement of trolley T with respect to the contact segments 37—38 to actuate the rudder.

For changing the direction of the craft in azimuth or for rendering the azimuth controlling means ineffective, I may provide a plate 120 fixed to the gyro casing G and adapted to be engaged by a locking member L normally pressed into engagement with plate 120 by some means such as spring S. It will be seen that when the cup-shaped member L engages plate 120 that the gyro G is effectively locked against any movement in a fixed position on the shaft, i. e. preferably with its spinning axis fore and aft and that it will turn with said craft. The said locking member L may be controlled by the operator simultaneously with the control of the means for rendering the automatic azimuth steering control effective or ineffective, for it will be realized that when the automatic steering control is rendered ineffective by disengaging worm 44 from wormwheel 45 it is also desirable to lock the gyro to the craft. I may, therefore, cause the toggle 90 which is actuated by the operator when worm 44 is to be disengaged from wormwheel 45 to rotate a shaft 120' pinned to the toggle member at 121 and said shaft to operate a toggle 122 against the action of the spring S to actuate the locking member L. If it were not for the inter-position of toggle 122 which, when actuated to position to unlock the gyro, prevents spring S from operating, said spring would be sufficiently strong to actuate the toggle 90 to ineffective position. Thus I obtain simultaneous operation by a single act under the control of the operator of the means for rendering the automatic steering means ineffective and the means for locking the gyro to the craft.

I may regulate the sensitivity of my azimuth control by determining the amount of effective lost motion between the trolley member T and the contact segments 37—38. For this purpose the trolley member T comprises in reality two trolleys T' and T'', which may be mounted on the ends of links 111—112 adjustably carried in a fixed frame 113 so that said links 111—112 may be moved toward or away from each other to vary the effective distance between trolleys T' and T''. Thus when the axes of both trolleys are in alignment, it will be seen that the maximum amount of lost motion is provided since said trolleys must then traverse one half of the insulation strip 39 before any contact is made to close the circuit through magnets 40 and 41. When, however, the trolleys T' and T'' are separated, then the effective insulation is cut down until a point is reached where the trolleys T' and T'' are closely adjacent the outer edge of the insulation strip 39 permitting contact to be made with segment 37 or 38 upon a slight movement of the craft off course in which position the control is very sensitive. Under certain weather conditions on the other hand a less sensitive control is preferable which may be secured by moving the trolleys toward each other as above explained.

Figure 13:
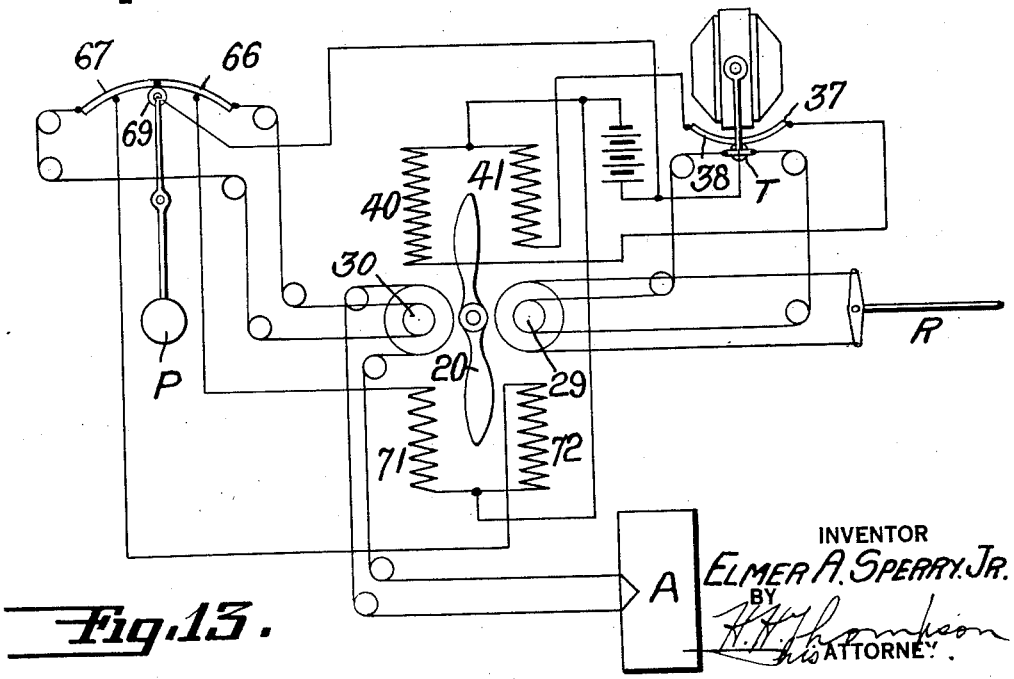
Fig. 13 is a wiring diagram of the invention.

By reference to Fig. 13 there is shown a diagrammatic representation of the operation of certain features of my invention, the numbering and lettering of the parts corresponding to the numbering in the other figures and will make the operation clear. Thus, for instance, there is shown the wind driven servo motor 20, indicated diagrammatically by the fan, and the two drives 29 and 30 taken off said servo motor. The magnets 40 and 41 are shown as adapted to be energized by engagement of trolley member T with segments 37 and 38 respectively, said drive 29 controlling the rudder R. There is also shown one of the two pendulums P for controlling the ailerons and elevators, said pendulum P with its trolley 69 cooperating with the contact segments 66 and 67 to control the magnets 71 and 72. The shaft 30 is shown as controlling the cable connections to the aileron A. It will be understood that an exact duplicate of this system controls the elevators (not shown).

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic control device for aircraft having ailerons and a rudder, means responsive to deviations from a predetermined course, means controlled by said deviation-responsive means for actuating said rudder to restore the craft to said course, means responsive to lateral inclination of the craft, means controlled by said inclination-responsive means for actuating said ailerons to restore the craft to horizontal position, and means whereby said aileron-actuating means actuates said rudder-actuating means.

2. In an automatic control device for aircraft having ailerons and a rudder, means responsive to deviation from a predetermined course, means controlled by said deviation-responsive means for actuating said rudder to restore the craft to its course, a follow-up connection from said last-named means to said first-named means, means responsive to lateral inclination of the craft, and means whereby said inclination-responsive means actuates said follow-up connection.

3. In an automatic control device for aircraft having ailerons and a rudder, means responsive to deviations from a predetermined course, means controlled by said deviation-responsive means for actuating said rudder to restore the craft to its course, a follow-up connection from said last-named means to said first-named means, means responsive to lateral inclination of the craft, means controlled by said inclination-responsive means for actuating said ailerons to restore said craft to horizontal position, and means whereby said aileron-actuating means actuates said follow-up connection.

4. In an automatic control device for aircraft having ailerons and a rudder, means responsive to deviations from a predetermined course, means controlled by said deviation-responsive means for actuating said rudder to restore the craft to its course, a follow-up connection from said last-named means to said first-named means, means responsive to lateral inclination of the craft, means controlled by said inclination-responsive means for actuating said ailerons to restore said craft to horizontal position, a follow-up connection between said last-named means and said inclination-responsive means, and means whereby said second follow-up connection actuates said first follow-up connection.

5. In an automatic control device for aircraft having ailerons, elevators and a rudder, means responsive to deviations from a predetermined course including a gyro having three degrees of freedom, means controlled by said gyro for actuating said rudder, means including a liquid-damped pendulum responsive to lateral inclination of the craft, means controlled by said pendulum for actuating said ailerons, a cross connection between said ailerons and rudder controls, means including a second liquid-damped pendulum right-angularly disposed with respect to said first pendulum and responsive to fore and aft inclination of the craft, and means controlled by said second pendulum for actuating said elevators.

6. In combination with an aircraft having a plurality of controls, automatic means for operating each of said controls, hand-operated means for operating each of said controls, each of said automatic means including an irreversible gearing connection, and means whereby said connection may be rendered effective or ineffective at will.

7. In combination with an aircraft having a plurality of controls, automatic means for operating each of said controls, hand-operated means for operating each of said controls, each of said automatic means including an irreversible gearing connection, and means whereby the gears of said connection may be engaged or disengaged at will.

8. In combination with an aircraft having a rudder, means for maintaining a fixed baseline in azimuth, means including a pair of spaced contact segments carried by said first means and having an insulating space of a predetermined width therebetween and a contact member cooperating with said segments and carried by said craft for controlling said rudder, said contact member including a pair of electrically common trolleys and means whereby said trolleys may be moved toward or away from each other for varying the amount of lost motion of said contact member in the space between said contact segments whereby the sensitivity of the control may be varied.

9. In combination with an aircraft, means including a gyro for maintaining a fixed baseline, means responsive to deviations of the craft from said baseline for restoring the craft to initial position, mechanical means for disconnecting said restoring means, and mechanical means actuated by said last-named means for simultaneously rendering said gyro ineffective as a baseline.

10. In combination with an aircraft, means including a gyro for maintaining a fixed baseline, means responsive to deviations of the craft from said baseline for restoring the craft to initial position, mechanical means for disconnecting said restoring means, and mechanical means actuated by said last-named means for simultaneously locking said gyro to the craft.

11. In combination with an aircraft having a rudder, means including a gyro having three degrees of freedom for maintaining a fixed baseline in azimuth, means responsive to deviations of the craft from said baseline for actuating said rudder to restore the craft to its course, mechanical means whereby said rudder actuating means may be rendered ineffective, and mechanical means actuated by said last-named means for simultaneously locking said gyro in a predetermined position on said craft.

12. In an automatic control device for aircraft having ailerons and a rudder, means responsive to deviations from a predetermined course, means controlled by said deviation-responsive means for actuating said rudder to restore the craft to said course, means responsive to lateral inclination of the craft, means controlled by said inclination-responsive means for actuating said ailerons to restore the craft to horizontal position, and means whereby the one of said actuated means also actuates the other of said means.

In testimony whereof I have affixed my signature.

ELMER A. SPERRY, Jr.